May 17, 1938.  J. A. CRESSWELL ET AL  2,117,946
SPHERICAL BOOK
Filed Feb. 8, 1937  2 Sheets-Sheet 1
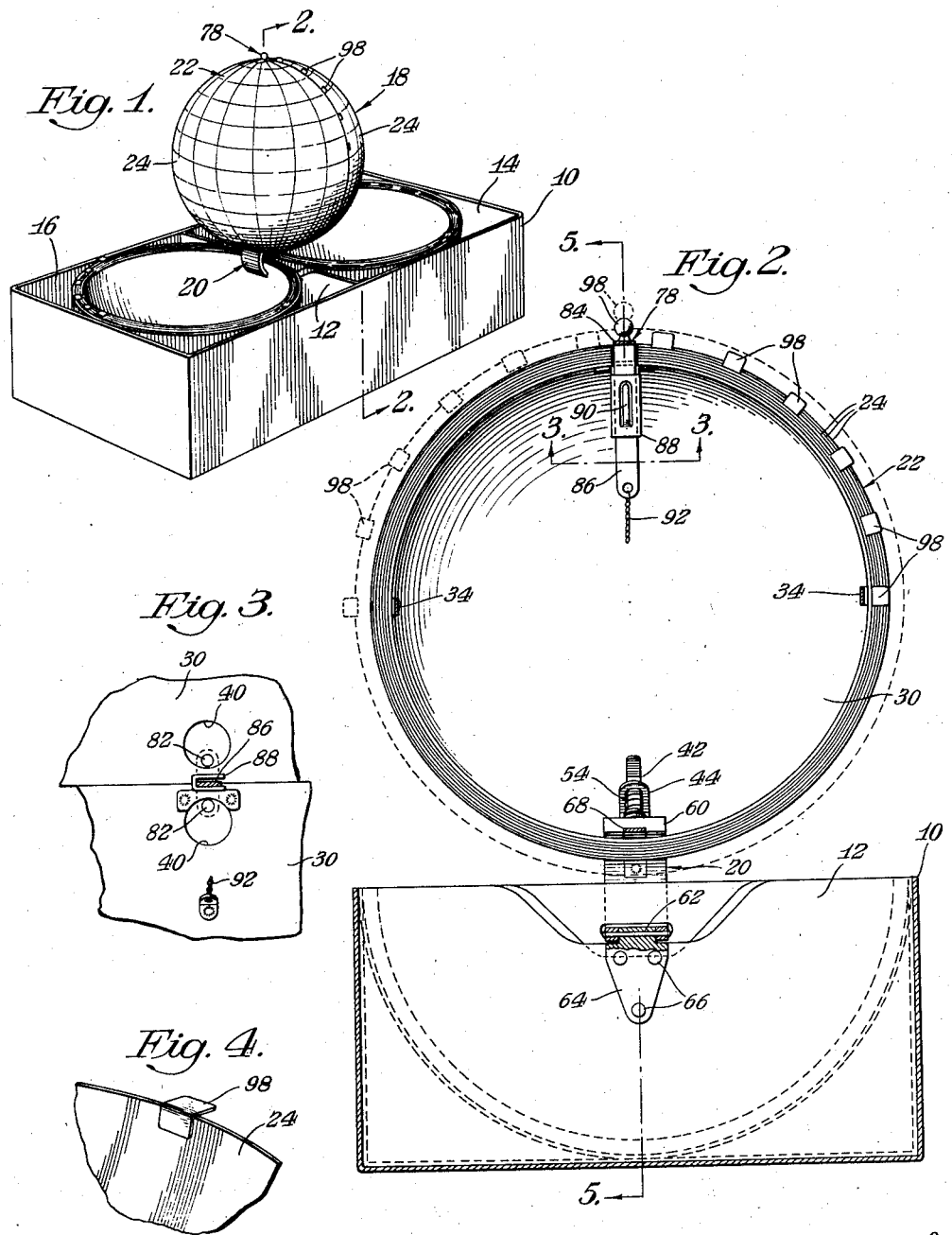
John A. Cresswell &
Charles H. Leavell.
INVENTORS
BY Victor J. Evans & Co.
THEIR ATTORNEYS May 17, 1938. J. A. CRESSWELL ET AL 2,117,946
SPHERICAL BOOK
Filed Feb. 8, 1937 2 Sheets-Sheet 2
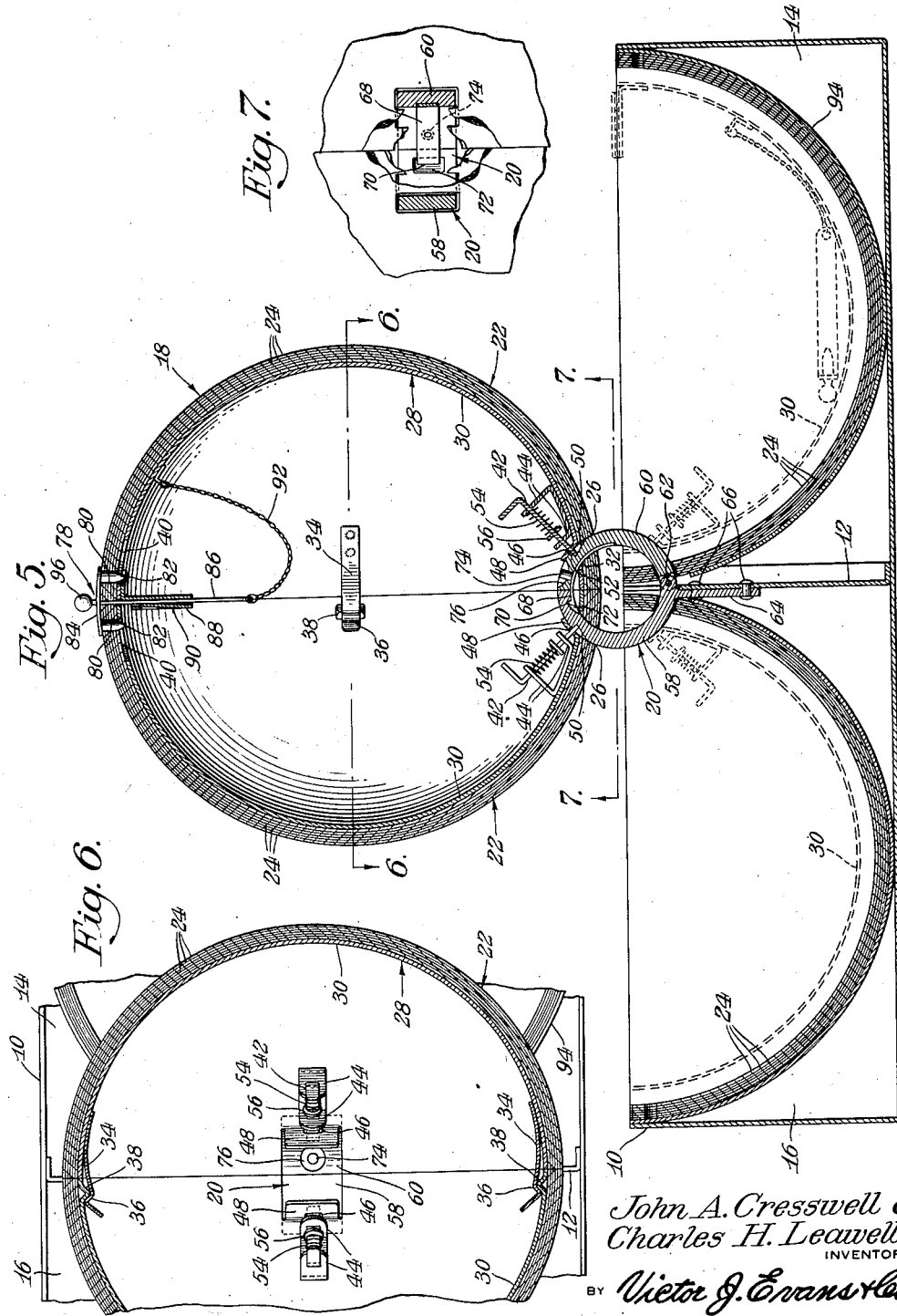
John A. Cresswell &
Charles H. Leawell
INVENTORS
BY Victor J. Evans & Co.
THEIR ATTORNEYS Patented May 17, 1938

2,117,946

UNITED STATES PATENT OFFICE 2,117,946

SPHERICAL BOOK

John A. Cresswell and Charles H. Leavell, Chicago, Ill.

Application February 8, 1937, Serial No. 124,769

9 Claims. (Cl. 35—46)

Our invention relates to educational devices, and includes among its objects and advantages the provision of an improved spherical book.

An object of our invention is to provide a book made up of a plurality of spheres arranged in nested relation one within the other and in which the spheres are made up in sections of complementary parts separably connected together. The sections may be provided with educational matter, and the sections of each sphere are so related as to provide continuity of the educational matter appearing thereon.

A further object is to provide an educational device in the nature of a book made up of nested spherical units in which the units may be individually exposed for reading and studying purposes.

Another object is to provide a spherical book including a box for housing the book and in which novel means is provided for balancing the book exteriorly of the box.

A further object is to provide a spherical book made up of a plurality of spheres, each comprising complementary parts hingedly connected together and in which novel means is provided for latching the complementary parts in unit relation.

In the accompanying drawings:

Fig. 1 is a perspective view showing our invention;

Fig. 2 is a sectional view along the line 2—2 of Fig. 1;

Fig. 3 is a sectional view along the line 3—3 of Fig. 2;

Fig. 4 is a perspective view of one of the tabs associated with each of the spherical units;

Fig. 5 is a sectional view along the line 5—5 of Fig. 2;

Fig. 6 is a sectional view along the line 6—6 of Fig. 5; and

Fig. 7 is a sectional view along the line 7—7 of Fig. 5.

In the embodiment selected to illustrate our invention, we make use of a box 10 provided with a partition 12 to provide compartments 14 and 16. Upon the partition 12 we mount a spherical book 18 through the medium of a ring 20.

The book 18 comprises a plurality of spherical units or leaves 22 nested one within the other, each of which comprises two complementary hemispherical sections 24. The sections 24 in each unit 22 are arranged to lie in abutting relation to define a complete sphere, as illustrated in Fig. 5. The educational material may be printed or otherwise attached to the sections 24, which material may be so arranged as to provide continuity when the complementary sections are arranged in unit relation.

We arrange the spherical units 22 in such a manner that the units nest closely, and all the units divide in the same plane. The educational matter may be so arranged as to portray successively from the outer to the inner sphere or from the inner to the outer sphere various geological eras, or various types of races, political divisions and subdivisions in terms of maps, the successive unfolding of political and religious philosophies, etc.

Specifically, the sections 24 are provided with aligned openings 26 for loosely receiving the ring 20 which is of the split type. The inner sphere 22 closely embraces a metallic sphere 28 which is made up of complementary sections 30 in the same way as the units 22. We illustrate the sections 30 as being provided with openings 32 for loosely receiving the ring 20. One of the sections 30 carries two spring elements 34 shaped to provide offsets 36 arranged to hook over elevations 38 which are struck from the other section. The springs 34 are so constructed that the offsets 36 will climb the elevations 38 for latching purposes incident to pressing the sections 30 together. Similarly, the springs 34 are released by merely pulling the sections 30 apart. To facilitate such separation, we provide each section with an opening 40 through which a finger may be inserted for grasping purposes.

To balance the sphere 28 we provide each section 30 with a latch bar 42 slidably mounted within openings in two plates 44. Each bar projects through an opening 46 in the lips 48 struck from the material of its respective section 30 to provide the opening 46. The ring 20 is recessed at 50 to provide abutments 52 against which the bars 42 have abutting relation to support the units 22 and 28 in a balanced upright position, as illustrated in Figs. 1 and 5. Each bar 42 is provided with a spring 54 which cooperates with one of the plates 44 and a washer 56 fixedly connected with the bar 42 for urging it in the direction of the ring 20. The bars 42 are retracted automatically when the sections 30 are pulled apart.

In Fig. 7, we illustrate the ring 20 as being rectangular in cross section. The width of the ring is considerably more than its thickness, and the openings 26 hug the ring closely so that an effective balancing action is attained in a plane at right angles to the balancing action of the bars 42. Figs. 2 and 5 illustrate the ring 20 as being made up of sections 58 and 60 with the section 60 hingedly connected at 62 with the section 58, which includes a lip 64 riveted to the partition 12 at 66. Section 60 carries a spring element 68 including a hook 70 arranged to lie within the recess 72 in the section 58. When so positioned, the two sections are effectively connected into a unitary whole. We prefer to mount the spring element 68 in such a manner as to bring its inner surface flush with the inner face of the section 60, thus eliminating projections which might interfere with the movement of the sections 22 connected with the section 60 of the ring 20. A pin 74 is carried by the spring element 68 and projects through an opening in the section 60. Pressure on the pin 74 moves the hook 70 out of holding relation with the recess 72, whereby the ring 20 may be opened for the attachment or removal of units 22. By retracting one of the bars 42 sufficiently far to bring its end out of holding relation with its respective abutment 52, all the units 22 and the metallic unit 28 may be shifted to a position within either of the compartments 14 and 16. To prevent interference from the pin 12, we recess the section 60 of the ring at 76 to provide space for accommodating the finger or an instrument when depressing the pin 74.

Diametrically opposite the ring 20 we provide a latch 78 for holding the sections 24 in connected relation. The sections 24 are provided with aligned openings 80 for receiving pins 82 carried by a plate 84, which in turn is mounted on a bar 86. The bar 86 is slidably mounted in a tubular member 88 fixedly connected with one of the sections 30, as by welding. To facilitate movement of the pins 82 through the openings 80, we taper their ends, as indicated at 88. Frictional relation is established between the tubular member 88 and the bar 86 through the medium of a spring element 90 struck from the tubular member. The frictional relation is such as to support the bar 86 in all its adjusted positions to facilitate separation and connection of the sections 24.

A chain 92 has one end attached to one of the sections 30 and its other end attached to the inner end of the bar 86 to prevent loss of the latch 78. The latch 78 may be housed within its respective section 30 when the sections 30 are separated to lie within their respective compartments 14 and 16. To lend support to the sections 24 in their open position, we position a metallic shell 94 within each of the compartments 14 and 16, which shells conform to the size and shape of the outer unit 22. The units 22 may comprise paper, metal or any suitable material. The shells 94 may be welded to the box 10. Shifting of the latch 78 may be consummated manually through the medium of a head 96 which constitutes a grip.

One section 24 of each of the units 22 may be provided with a tab 98 for identifying the subject matter of its associated unit. In a paper construction, the tabs 98 may be glued to the supporting section 24, while in the metallic construction the tabs may be welded thereto.

Our device provides a spherical book in which the units 22 may be easily and quickly separated or latched in connected relation. The units 22 are easily separated to display any one of the units, and when so separated, the outer sections which are not used lie housed within the box 10. The sections 30 are effectively supported in an upright position while the two springs 34 provide an effective connection. With the sections 24 and 30 housed within the box 10 all the parts are protected from damage, and the unit is compact and so arranged as to facilitate packaging and transportation. Each unit 22 is easily accessible for study purposes. A large number of units may be associated with the ring 20.

Without further elaboration, the foregoing will so fully explain our invention, that others may, by applying current knowledge, readily adapt the same for use under various conditions of service.

We claim:

1. A spherical book comprising a support, a first sphere mounted on said support, a second sphere enveloping the first sphere, said second sphere comprising complementary sections, and a hinge connection between the complementary sections and said support, said sections being movable away from each other about the axis of the hinge for uncovering the first sphere.

2. A spherical book comprising a support, a first sphere mounted on said support, said first sphere comprising a pair of complementary sections, a second sphere enveloping the first sphere, said second sphere comprising a pair of complementary sections, a hinge connection between the complementary sections of each sphere and said support, the complementary sections in each sphere being movable away from each other about the axis of the hinge, means for latching the first sphere to the support in an upright position, and means for latching the sections of the second sphere in enveloping relation with the first sphere.

3. A spherical book comprising a base, a plurality of spherical units nested one within the other, each of said spherical units comprising complementary sections, and means for pivotally connecting the complementary sections in each spherical unit with said base, the complementary sections in each spherical unit being movable away from each other about their pivotal axis for uncovering the inner spherical unit.

4. A spherical book comprising a base, a plurality of spherical units nested one within the other, each of said spherical units comprising complementary sections, and means for pivotally connecting the complementary sections in each spherical unit with said base, the complementary sections in each spherical unit being movable away from each other about their pivotal axis for uncovering the inner spherical unit, said base being in the nature of a box and having compartments, each of the complementary sections being movable to a position within one of said compartments.

5. A spherical book comprising a base, a plurality of spherical units nested one within the other, each of said spherical units comprising complementary sections, means for pivotally connecting the complementary sections in each spherical unit with said base, the complementary sections in each spherical unit being movable away from each other about their pivotal axis for uncovering the inner spherical unit, said base being in the nature of a box and having compartments, each of the complementary sections being movable to a position within one of said compartments, the inner sphere constituting a support for the enveloping spheres, and means for latching the inner sphere in an upright position on said base.

6. A spherical book comprising a base, a plurality of spherical units nested one within the other, each of said spherical units comprising complementary sections, means for pivotally connecting the complementary sections in each spherical unit with said base, the complementary sections in each spherical unit being movable away from each other about their pivotal axis for uncovering the inner spherical unit, said base being in the nature of a box and having compartments, each of the complementary sections being movable to a position within one of said compartments, the inner sphere constituting a support for the enveloping spheres, means for latching the inner sphere in an upright position on said base, and means for latching the sections of the said outer spheres in enveloping relation with the said inner sphere.

7. A spherical book comprising a base, a plurality of spherical units nested one within the other, each of said spherical units comprising complementary sections, means for pivotally connecting the complementary sections in each spherical unit with said base, the complementary sections in each spherical unit being movable away from each other about their pivotal axis for uncovering the inner spherical unit, and an identifying tab connected with each of the complementary sections in each spherical unit.

8. A spherical book comprising a base, a plurality of spherical units nested one within the other, each of said spherical units comprising complementary sections, and means for pivotally connecting the complementary sections in each spherical unit with said base, the complementary sections in each spherical unit being movable away from each other about their pivotal axis for uncovering the inner spherical unit, said means comprising a ring carried by the base and passing loosely through openings in each of the complementary sections.

9. A spherical book comprising a base, a plurality of spherical units nested one within the other, each of said spherical units comprising complementary sections, means for pivotally connecting the complementary sections in each spherical unit with said base, the complementary sections in each spherical unit being movable away from each other about their pivotal axis for uncovering the inner spherical unit, said complementary sections comprising hemispheres and the hemispheres in one spherical unit having abutting relation in a plane substantially common to the abutting relation between the hemispheres in the other units, means for latching the complementary sections of the inner sphere, and means for latching the complementary sections in the outer sphere in enveloping relation with the inner sphere.

CHARLES H. LEAVELL.
JOHN A. CRESSWELL.